US012693737B2

(12) United States Patent　　(10) Patent No.:　US 12,693,737 B2
Li et al.　　(45) Date of Patent:　Jul. 28, 2026

(54) GAZE-BASED DEVICE INTERACTIONS FOR NOTIFICATIONS

(71) Applicants:Zhenhao Li, Markham (CA); Liang Hu, Shenzhen (CN); Zheng Liu, Toronto (CA); Yuanhao Yu, Vaughan (CA); Jin Tang, Markham (CA)

(72) Inventors: Zhenhao Li, Markham (CA); Liang Hu, Shenzhen (CN); Zheng Liu, Toronto (CA); Yuanhao Yu, Vaughan (CA); Jin Tang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/884,476

(22) Filed: Sep. 13, 2024

(65) Prior Publication Data

US 2025/0231618 A1　　Jul. 17, 2025

Related U.S. Application Data

(63) Continuation-in-part of application No. 18/412,926, filed on Jan. 15, 2024, now abandoned.

(51) Int. Cl.
G06F 3/01　　(2006.01)
G06F 3/0488　　(2022.01)

(52) U.S. Cl.
CPC ............ G06F 3/013 (2013.01); G06F 3/0488 (2013.01)

(58) Field of Classification Search
CPC .............................. G06F 3/013; G06F 3/04886
USPC ........................................................ 345/173
See application file for complete search history.

(56) References Cited

U.S. PATENT DOCUMENTS

| | | | |
|---|---|---|---|
| 10,444,831 B2 | 10/2019 | Funes Mora | |
| 2014/0247232 A1* | 9/2014 | George-Svahn | ........ G06F 3/012 |
| | | | 345/184 |
| 2016/0188181 A1* | 6/2016 | Smith | ................. G06F 3/04886 |
| | | | 715/765 |
| 2021/0319585 A1 | 10/2021 | Odobez et al. | |
| 2022/0148333 A1 | 5/2022 | Funes Mora et al. | |

FOREIGN PATENT DOCUMENTS

| | | | | |
|---|---|---|---|---|
| CN | 103853330 A | | 6/2014 | |
| CN | 106527693 A | | 3/2017 | |
| CN | 117472262 A | * | 1/2024 | ......... G06F 3/04883 |
| CN | 118444832 A | * | 8/2024 | |
| WO | WO-2024139594 A1 | * | 7/2024 | |

OTHER PUBLICATIONS

Kong, Andy. "EyeMU Interactions: Gaze + IMU Gestures on Mobile Devices". ICMI '21, Oct. 18-22, 2021, Montreal, QC, Canada.

* cited by examiner

*Primary Examiner* — Mark Edwards

(57)　　　　　ABSTRACT

Methods and devices for gaze-based device interactions are described. During display of a notification on a touch-sensitive display of an electronic device, gaze tracking is performed to determine point of gaze locations. It is determined, within a defined time period, that recent point of gaze locations fall within a proxy region of the notification. In response to determining that recent point of gaze locations fall within the proxy region of the notification, the electronic device is operated in a one-handed mode. In the one-handed mode, a touch input detected on the touch-sensitive display outside the notification is processed as an interaction with the notification.

20 Claims, 7 Drawing Sheets

To: Joe
From: Jane

Subject: Hi!

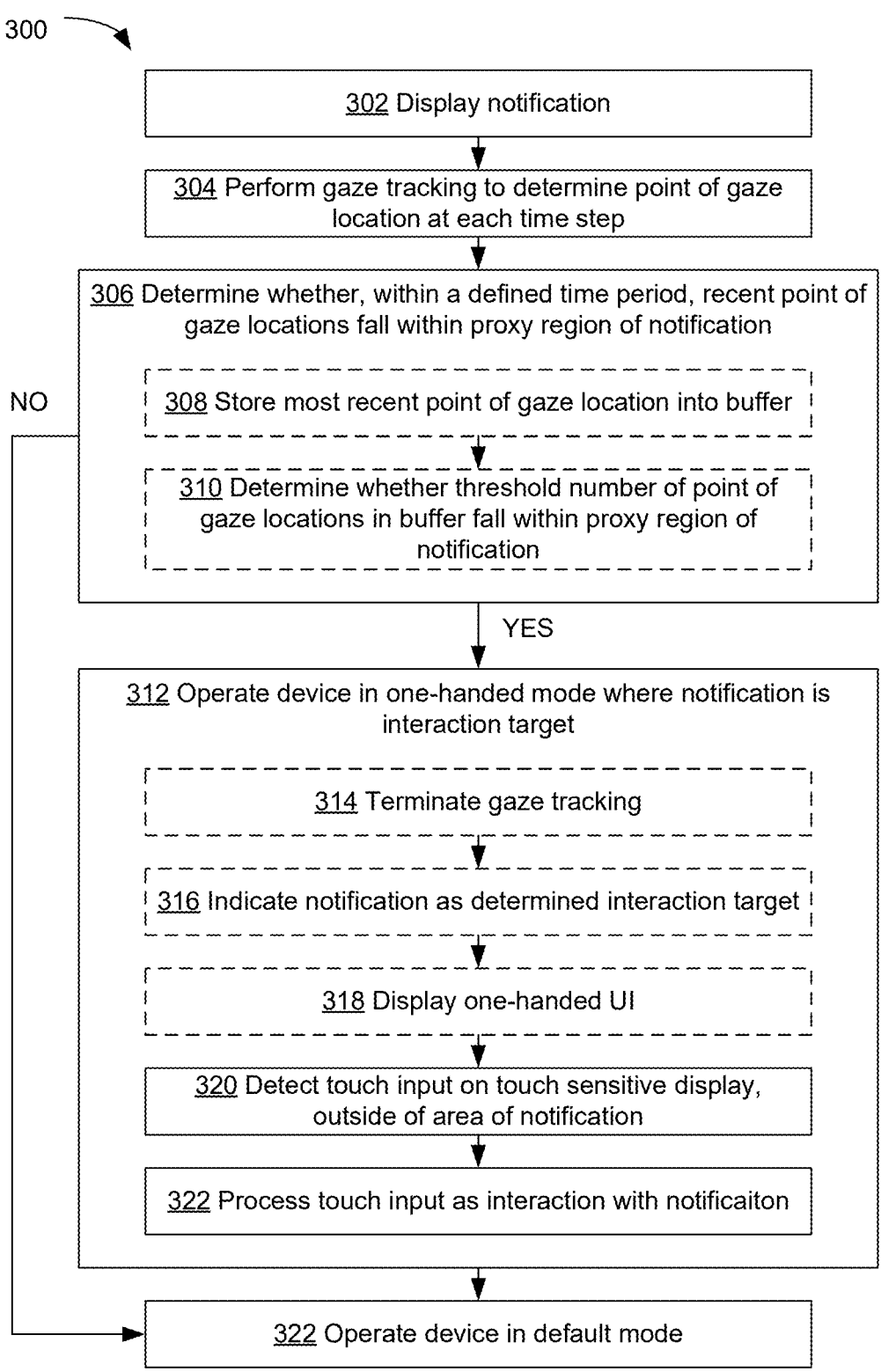

300

302 Display notification

304 Perform gaze tracking to determine point of gaze location at each time step

306 Determine whether, within a defined time period, recent point of gaze locations fall within proxy region of notification 308 Store most recent point of gaze location into buffer 310 Determine whether threshold number of point of gaze locations in buffer fall within proxy region of notification

NO

YES

312 Operate device in one-handed mode where notification is interaction target

314 Terminate gaze tracking

316 Indicate notification as determined interaction target

318 Display one-handed UI

320 Detect touch input on touch sensitive display, outside of area of notification 322 Process touch input as interaction with notificaiton 322 Operate device in default mode

FIG. 3

GAZE-BASED DEVICE INTERACTIONS FOR NOTIFICATIONS

CROSS-REFERENCE TO RELATED APPLICATIONS

The present application is a continuation-in-part of, and claims priority to, U.S. application Ser. No. 18/412,926, filed Jan. 15, 2024, which is incorporated by reference in its entirety herein.

TECHNICAL FIELD

The present disclosure relates to methods and devices enabling gaze-based device interactions, in particular gaze-based touch interactions for notifications.

BACKGROUND

Touch-based user interactions on a handheld device (e.g., smartphone) typically requires a user to touch certain regions of a touch-sensitive display. When a handheld device is held in a typical one-handed posture, the thumb of the hand holding the device is typically used for touch inputs. However, the thumb generally has limited reach, making it difficult for the user to provide touch input in certain areas of the touch-sensitive display. This problem is exacerbated by recent trends towards larger touch-sensitive displays.

It would be useful to enable improved user interactions with a touch-sensitive display.

SUMMARY

In various examples, the present disclosure describes methods and devices that provide gaze-based touch interactions. Gaze detection may be used to enable a user to interact with notifications that are displayed in a region of a touch-sensitive display that would otherwise be out of reach of a user's touch (e.g., out of reach of a user's thumb when holding a handheld device in the same hand). This provides a more efficient manner of user interaction because a user can conveniently provide touch inputs using the same hand that is holding a handheld device. Additionally, examples of the present disclosure may enable more intuitive user interaction in users with physical limitations.

In some examples, the present disclosure describes a gaze-based mechanism that enables a device to switch between a one-handed mode (sometimes referred to as an active mode) and a default mode (sometimes referred to as an inactive mode), based on detection of the user's gaze in a region defined relative to a displayed notification. In the one-handed mode, touch inputs outside of the area of the displayed notification may be used to interact with the displayed notification. In the second mode, conventional interaction mechanisms (e.g., requiring touch input within the displayed notification to interact with the notification) may be supported. Technical advantages include using gaze detection to enable user interactions with a displayed notification that is otherwise out of reach of the user's touch. For example, one-handed interactions (where the user can interact with the notification using the same hand that is holding the handheld device) can be enabled.

The use of gaze tracking to enable the one-handed mode helps to avoid false positives (e.g., where a user's touch input is erroneously interpreted as an interaction with the displayed notification), while simplifying the physical motion of the user to interact with the notification. Examples of the present disclosure also provide a user interface (UI) design that may conveniently inform the user of available options for interacting with a displayed notification.

In an example aspect, the present disclosure describes a method at an electronic device, the method including: during display of a notification on a touch-sensitive display of the electronic device, performing gaze tracking to determine point of gaze locations; determining, within a defined time period, that recent point of gaze locations fall within a proxy region of the notification; and in response to determining that recent point of gaze locations fall within the proxy region of the notification, operating the electronic device in a one-handed mode, wherein, in the one-handed mode, a touch input detected on the touch-sensitive display outside the notification is processed as an interaction with the notification.

In an example of the preceding example aspect of the method, determining that recent point of gaze locations fall within the proxy region of the notification may include: using a sliding window, corresponding to a time window shorter than the defined time period, to define the recent point of gaze locations; and determining that a threshold amount of point of gaze locations in the sliding window fall within the proxy region of the notification.

In an example of any of the preceding example aspects of the method, determining that recent point of gaze locations fall within the proxy region of the notification may include: storing the determined point of gaze location at each timestep in a first-in first-out buffer, the buffer being sized to correspond to the time window of the sliding window; and determining that a threshold number of point of gaze locations stored in the buffer fall within the proxy region of the notification.

In an example of any of the preceding example aspects of the method, the proxy region may be defined to encompass a display area of the notification and extend beyond the display area of the notification.

In an example of any of the preceding example aspects of the method, the method may include, during operation of the electronic device in the one-handed mode: detecting the touch input on the touch-sensitive display outside a display area of the notification; and processing the touch input as the interaction with the notification.

In an example of any of the preceding example aspects of the method, the method may include, during operation of the electronic device in the one-handed mode: detecting another touch input on the touch-sensitive display in a display area of the notification; and ending operation of the electronic device in the one-handed mode and processing the other touch input as the interaction with the notification.

In an example of any of the preceding example aspects of the method, the method may include, during operation of the electronic device in the one-handed mode: displaying a one-handed user interface (UI) including at least one of: a visual indicator indicating a type of touch input for interacting with the notification; a UI element displayed in a thumb-accessible region of the touch-sensitive display for interacting with the notification; a visual element indicating operation in the one-handed mode; or a visual modification of the notification.

In an example of any of the preceding example aspects of the method, the notification may be displayed in a thumb-inaccessible region of the touch-sensitive display.

In an example of any of the preceding example aspects of the method, the method may include: in response to determining that recent point of gaze locations fall within the proxy region of the notification, terminating gaze tracking.

In another example aspect, the present disclosure describes an electronic device including: a processing unit configured to execute instructions to cause the electronic device to: during display of a notification on a touch-sensitive display of the electronic device, perform gaze tracking to determine point of gaze locations; determine, within a defined time period, that recent point of gaze locations fall within a proxy region of the notification; and in response to determining that recent point of gaze locations fall within the proxy region of the notification, operate the electronic device in a one-handed mode, wherein, in the one-handed mode, a touch input detected on the touch-sensitive display outside the notification is processed as an interaction with the notification.

In an example of the preceding example aspect of the electronic device, the processing unit may be configured to execute the instructions to cause the electronic device to determine that recent point of gaze locations fall within the proxy region of the notification by: using a sliding window, corresponding to a time window shorter than the defined time period, to define the recent point of gaze locations; and determining that a threshold amount of point of gaze locations in the sliding window fall within the proxy region of the notification.

In an example of any of the preceding example aspects of the electronic device, the processing unit may be configured to execute the instructions to cause the electronic device to determine that recent point of gaze locations fall within the proxy region of the notification by: storing the determined point of gaze location at each timestep in a first-in first-out buffer, the buffer being sized to correspond to the time window of the sliding window; and determining that a threshold number of point of gaze locations stored in the buffer fall within the proxy region of the notification.

In an example of any of the preceding example aspects of the electronic device, the proxy region may be defined to encompass a display area of the notification and extend beyond the display area of the notification.

In an example of any of the preceding example aspects of the electronic device, the processing unit may be configured to execute the instructions to cause the electronic device to, during operation of the electronic device in the one-handed mode: detect the touch input on the touch-sensitive display outside a display area of the notification; and process the touch input as the interaction with the notification.

In an example of any of the preceding example aspects of the electronic device, the processing unit may be configured to execute the instructions to cause the electronic device to, during operation of the electronic device in the one-handed mode: detect another touch input on the touch-sensitive display in a display area of the notification; and end operation of the electronic device in the one-handed mode and processing the other touch input as the interaction with the notification.

In an example of any of the preceding example aspects of the electronic device, the processing unit may be configured to execute the instructions to cause the electronic device to, during operation of the electronic device in the one-handed mode: display a one-handed user interface (UI) including at least one of: a visual indicator indicating a type of touch input for interacting with the notification; a UI element displayed in a thumb-accessible region of the touch-sensitive display for interacting with the notification; a visual element indicating operation in the one-handed mode; or a visual modification of the notification.

In an example of any of the preceding example aspects of the electronic device, the notification may be displayed in a thumb-inaccessible region of the touch-sensitive display.

In an example of any of the preceding example aspects of the electronic device, the processing unit may be configured to execute the instructions to cause the electronic device to: in response to determining that recent point of gaze locations fall within the proxy region of the notification, terminate gaze tracking.

In an example of any of the preceding example aspects of the electronic device, the electronic device may be a hand-held device.

In another example aspect, the present disclosure describes a non-transitory computer readable medium having instructions stored thereon, wherein the instructions are executable by a processing unit of an electronic device to cause the electronic device to: during display of a notification on a touch-sensitive display of the electronic device, perform gaze tracking to determine point of gaze locations; determine, within a defined time period, that recent point of gaze locations fall within a proxy region of the notification; and in response to determining that recent point of gaze locations fall within the proxy region of the notification, operate the electronic device in a one-handed mode, wherein, in the one-handed mode, a touch input detected on the touch-sensitive display outside the notification is processed as an interaction with the notification.

In an example of the preceding example aspect of the non-transitory computer readable medium, the instructions may cause the electronic device to perform any preceding examples of the preceding example aspects of the method.

In another example aspect, the present disclosure describes a processing module configured to control an apparatus to cause the apparatus to carry out any preceding examples of the preceding example aspects of the method.

In another example aspect, the present disclosure describes a system chip including a processing unit configured to execute instructions to cause an apparatus to carry out any preceding examples of the preceding example aspects of the method.

In another example aspect, the present disclosure describes a computer program characterized in that, when the computer program is run on a computer, the computer is caused to execute any preceding examples of the preceding example aspects of the methods.

BRIEF DESCRIPTION OF THE DRAWINGS

Reference will now be made, by way of example, to the accompanying drawings which show example embodiments of the present application, and in which:

FIG. 3 is a flowchart illustrating an example method for gaze-based device interaction, in accordance with examples of the present disclosure.

Similar reference numerals may have been used in different figures to denote similar components.

DETAILED DESCRIPTION

In various examples, the present disclosure describes methods and devices that enable gaze-based touch interactions to be used for interacting with a notification (e.g., a pop-up message window) on an electronic device, such as a handheld device (e.g., a smartphone). In the present disclosure, the term "touch input" is intended to encompass various types of input that may be detected by an electronic device as a result of an object (e.g., a user's finger or a stylus) being in contact with or nearly in contact with the electronic device. A touch input may, for example, be an input detected by a capacitive sensor, a force sensor or a pressure sensor, among others, as well as a combination of such sensors. Thus, the term "touch input" may encompass force input and pressure input.

In the present disclosure, an electronic device may be any device that has a display, including a mobile communication device (e.g., smartphone), a tablet device, a laptop device, a desktop device, a vehicle-based device (e.g., an infotainment system or an interactive dashboard device), an interactive kiosk device, or an Internet of Things (IoT) device, among other possibilities. In particular, the present disclosure may encompass any electronic device having a touch-sensitive display, including handheld devices with touch-sensitive displays.

Figure 1A:
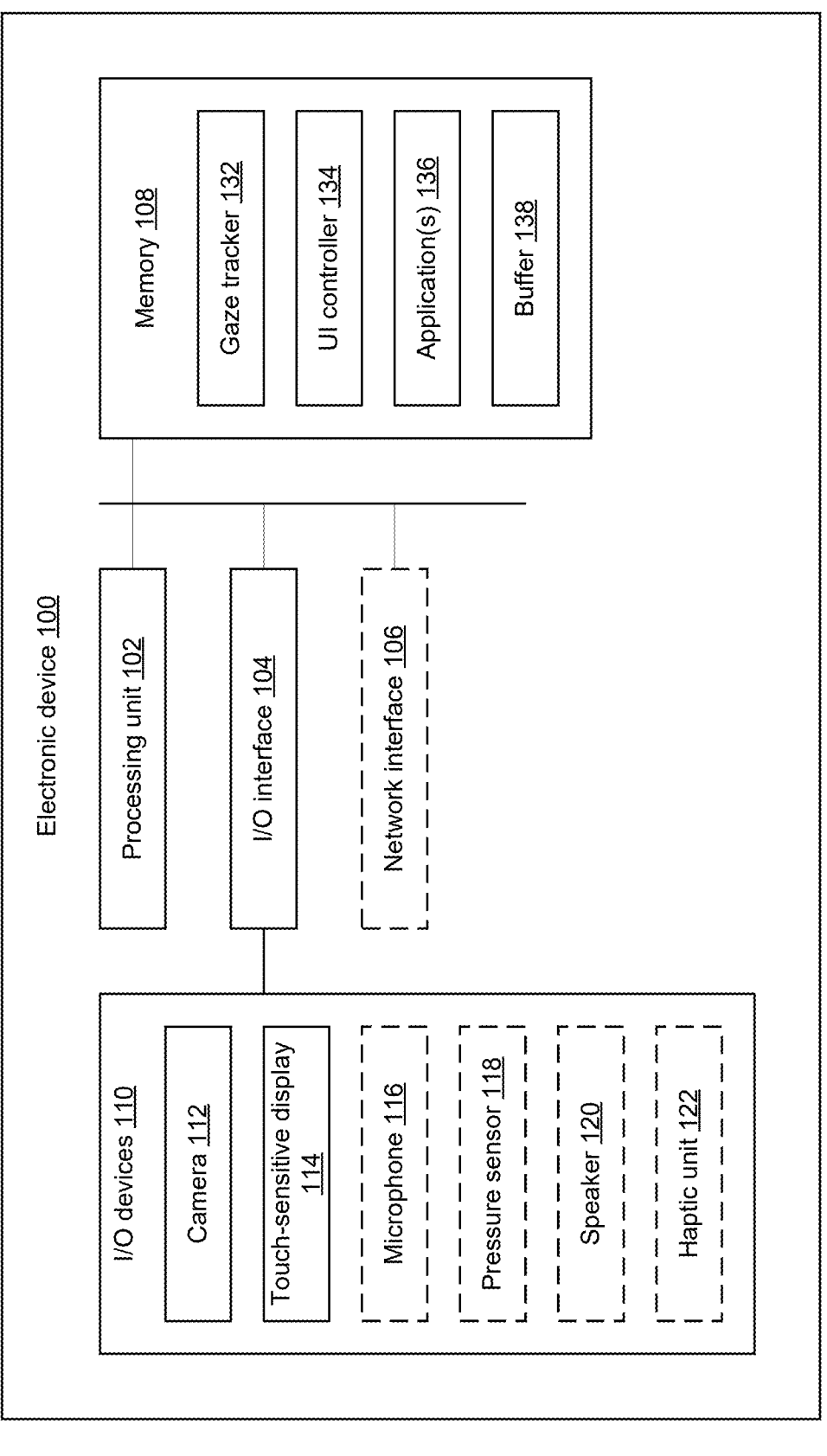
FIG. 1A is a block diagram illustrating an example of an electronic device which may be used to implement examples of the present disclosure.

FIG. 1A is a block diagram showing some components of an example electronic device 100 (which may also be referred to generally as an apparatus), which may be used to implement embodiments of the present disclosure. Although an example embodiment of the electronic device 100 is shown and discussed below, other embodiments may be used to implement examples disclosed herein, which may include components different from those shown. Although FIG. 1A shows a single instance of each component, there may be multiple instances of each component shown.

The electronic device 100 includes one or more processing units 102, such as a processor, a microprocessor, an application-specific integrated circuit (ASIC), a field-programmable gate array (FPGA), a dedicated logic circuitry, a graphics processing unit (GPU), a central processing unit (CPU), a neural processing unit (NPU), a dedicated artificial intelligence processor unit, or combinations thereof. The electronic device 100 also includes one or more input/output (I/O) interfaces 104, which interfaces with one or more I/O devices 110 such as a camera 112, a touch-sensitive display 114 (also referred to as a touchscreen or simply a display), optional microphone 116, optional pressure sensor 118 (also referred to as a force sensor), optional speaker 120 and/or optional haptic unit 122 (also referred to as a vibration unit). The electronic device 100 may include other input devices (e.g., physical buttons, keyboard, etc.) and/or other output devices (e.g., lights, etc.).

The electronic device 100 may include one or more optional network interfaces 106 for wired or wireless communication with a network (e.g., an intranet, the Internet, a P2P network, a WAN and/or a LAN) or other node. The network interface 106 may include wired links (e.g., Ethernet cable) and/or wireless links (e.g., one or more antennas) for intra-network and/or inter-network communications. In some examples, the network interface 106 may enable the electronic device 100 to communicate with a network to access cloud-based services.

The electronic device 100 includes one or more memories 108, which may include a volatile or non-volatile memory (e.g., a flash memory, a random access memory (RAM), and/or a read-only memory (ROM)). The non-transitory memory 108 may store instructions for execution by the processing unit 102, such as to carry out examples described in the present disclosure. For example, the memory 108 may include instructions, executable by the processing unit 102, to implement a gaze tracker 132 that detects and tracks a user's gaze (e.g., detects and tracks the location of the user's gaze on the display 114, using images of the user's eyes captured by the camera 112). The memory 108 may also include instructions to implement a user interface (UI) controller 134 that controls interactions with a UI based on gaze detection and touch input, as discussed further below. The memory 108 may also include instructions to implement one or more software applications 136 (e.g., email application, browser application, calendar application, etc.). The memory 108 may also include at least one buffer 138, which may be used to store gaze data, as discussed further below. The memory 108 may include other software instructions, such as for implementing an operating system and other functions of the electronic device 100.

In some examples, the electronic device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the electronic device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the electronic device 100 may communicate with each other via a bus, for example.

Examples of the present disclosure enable user interactions with the electronic device 100 using gaze input (e.g., detected by the gaze tracker 132) and touch input (e.g., detected by the touch-sensitive display 114). In some examples, touch input may be detected by a pressure sensor 118 instead of (or in addition to) a capacitive sensor of the touch-sensitive display 114. In some examples, the pressure sensor 118 may be integrated with the touch-sensitive display 114. In some examples, a pressure sensor 118 may be separate from the display 114 on the electronic device 100 (e.g., a touch-sensitive display 114 may be provided on the front of the electronic device 100 to detect touch input and a pressure sensor 118 may be provided on the back of the electronic device 100) to detect pressure input. Other variations may be encompassed by the present disclosure.

Figure 1B:
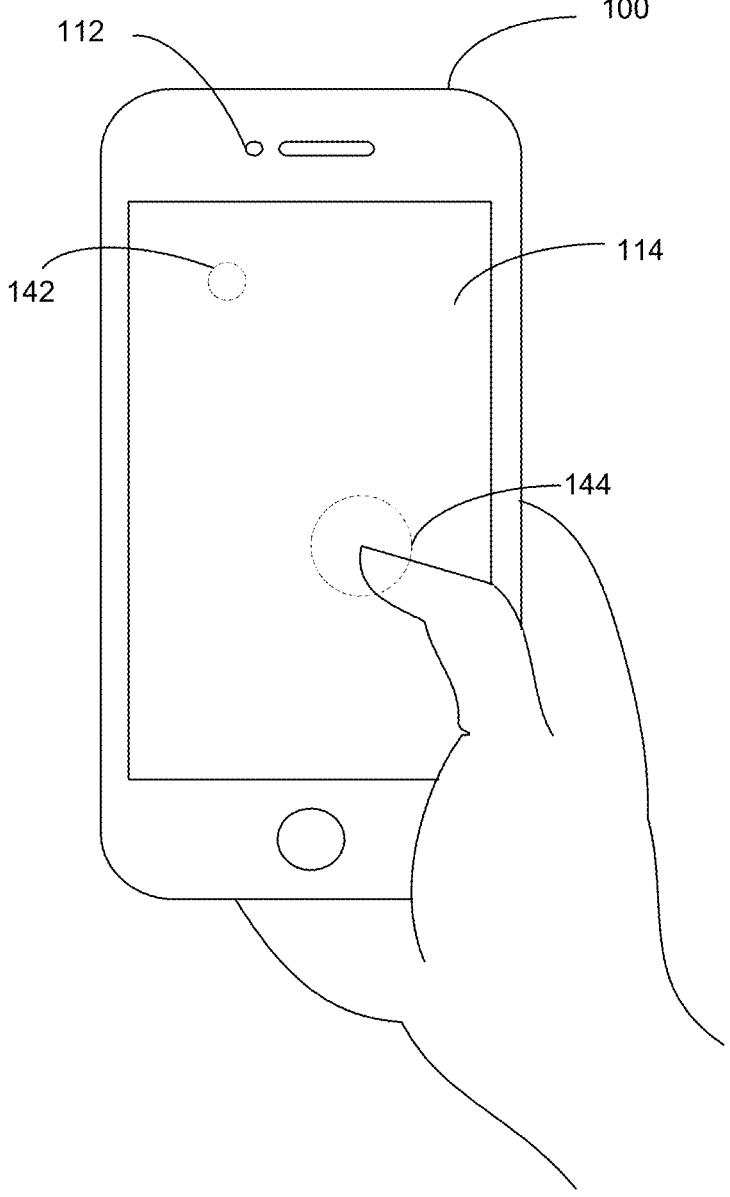
FIG. 1B illustrates a front view of an example electronic device which may be used to implement examples of the present disclosure.

FIG. 1B is a front view of an example embodiment of the electronic device 100, which is a smartphone in this example. In some examples, the electronic device 100 may be a handheld device that may be held in one hand. In particular, FIG. 1B illustrates how a user may hold and interact with the electronic device 100 using the same hand, which may be referred to as a one-handed pose. However, it should be understood that the present disclosure is not intended to be limited to handheld devices. For example, the present disclosure may be applicable to laptop devices, tablet devices, touch-sensitive kiosks, etc.

The camera 112 of the electronic device 100 may be a front-facing camera 112 capable of capturing images of the user's eyes while the user is looking at the display 114. The captured images may be used by the gaze tracker 132 to detect and track the point of gaze 142 (which may also be referred to as gaze input). The estimated location of the point of gaze 142 may be represented as an x-y coordinate in the frame of reference of the display 114 (e.g., x-y coordinate in terms of screen pixels). A touch input 144 may be detected by the display 114 (e.g., using capacitive sensors, resistive sensors, pressure sensors, etc.) and a location of the touch input 144 (also referred to as the touch location) may also be represented as an x-y coordinate in the frame of reference of the display 114 (e.g., x-y coordinate in terms of screen pixels). The touch input 144 may be detected over a region of the display 114 rather than at a point, in which case the touch location may be the centroid of the touch input 144. Both the point of gaze 142 and the touch input 144 may be provided as sensed inputs (e.g., represented by their respective x-y coordinates) and used by the UI controller 134 to manage interactions with a UI displayed on the display 114.

In examples where the electronic device 100 is a handheld device, when the device 100 is held in one hand of the user (e.g., as shown in FIG. 1B), the thumb of the same hand may be used to provide touch input 144 on the display 114. However, due to physical limitations in the human thumb, typically touch input 144 using the thumb is limited to the lower right corner of the display 114 (or lower left corner if the user is holding the device 100 in the left hand). On the other hand, the user's gaze may not be subject to such physical limitation and the point of gaze 142 may be readily used as input in other regions of the display 114, including upper regions that the user's thumb may not easily reach.

Typically, conventional UI design aims to place interactive elements (e.g., soft buttons, icons, textboxes, etc.) in the lower region of the display 114 (which may be referred to as the thumb-accessible region), so as to be easily accessible by the thumb of the same hand that is holding the device 100. Conventional UI design typically avoids placing interactive elements in the upper region of the display 114 where the thumb may not easily reach (which may be referred to as the thumb-inaccessible region). However, this results in inefficient use of the area of the display 114 because a significant portion of the display 114 becomes unusable (and thus "wasted") for displaying interactive elements. This problem of inefficient use of the area of the display 114 may be even more significant as the size of the device 100 (and thus the area of the display 114) increases, because the unusable area takes up a larger proportion of the display 114.

Additionally, many conventional UI designs cause notifications (e.g., notification of an incoming message) to be displayed in an upper region of the display 114 that is typically outside of the thumb-accessible region of the display 114. Showing notifications outside of the thumb-accessible region of the display 114 may avoid the notifications interfering with a user's current interaction task (e.g., avoids obscuring icons displayed in the thumb-accessible region). However, the result is that it is difficult for the user to interact with the notification using the thumb. For example, if the user wishes to dismiss the notification using a swipe touch gesture or wishes to select the notification (e.g., to open the application to view the incoming message related to the notification), the user may need to hold the device 100 with one hand and provide touch input using their other hand. This may slow down user interactions and degrade the user experience. Further, this may be challenging to users with physical limitations that preclude the usage of both hands.

There are some existing solutions that aim to provide gaze-based device interactions. For example, eye tracking systems have been developed that enable a user to interact with a UI by using the point of gaze to control the location of a cursor. However, such eye tracking systems are typically costly and require time-consuming calibration in order to perform with an acceptable level of accuracy. Additionally, such systems may be overly sensitive to a user's unconscious eye movements, leading to a large number of false positives. There has also been academic work on a UI design based on the combination of gaze tracking and motion sensors on a smartphone (e.g., Kong et al. "EyeMU Interactions: Gaze+ IMU Gestures on Mobile Devices" *Proceedings of the* 2021*International Conference on Multimodal Interaction,* 2021). The approach described by Kong et al. requires a user to fixate their gaze for half a second and then perform a motion gesture with the smartphone (e.g., flick the smartphone to the left or right) in order to interact with the UI. A drawback is that it may be unnatural for a user to fixate their gaze for the required amount of time (e.g., human gaze typically moves in saccades), and performing a motion gesture with the smartphone may be unintuitive and prone to false positives (e.g., user may be simply adjusting their grip on the smartphone instead of intentionally performing a motion gesture).

In the present disclosure, examples are described that may help to address at least some of the above challenges. Examples of the present disclosure may provide a human-machine interface (HMI) mechanism that enables a user to interact with an electronic device using gaze-based touch interactions. In particular, examples of the present disclosure may enable a user to interact with elements of a UI (e.g., a notification) displayed in a region that is not readily accessible when the user is holding and interacting with the device in a one-handed pose.

Figure 2A:
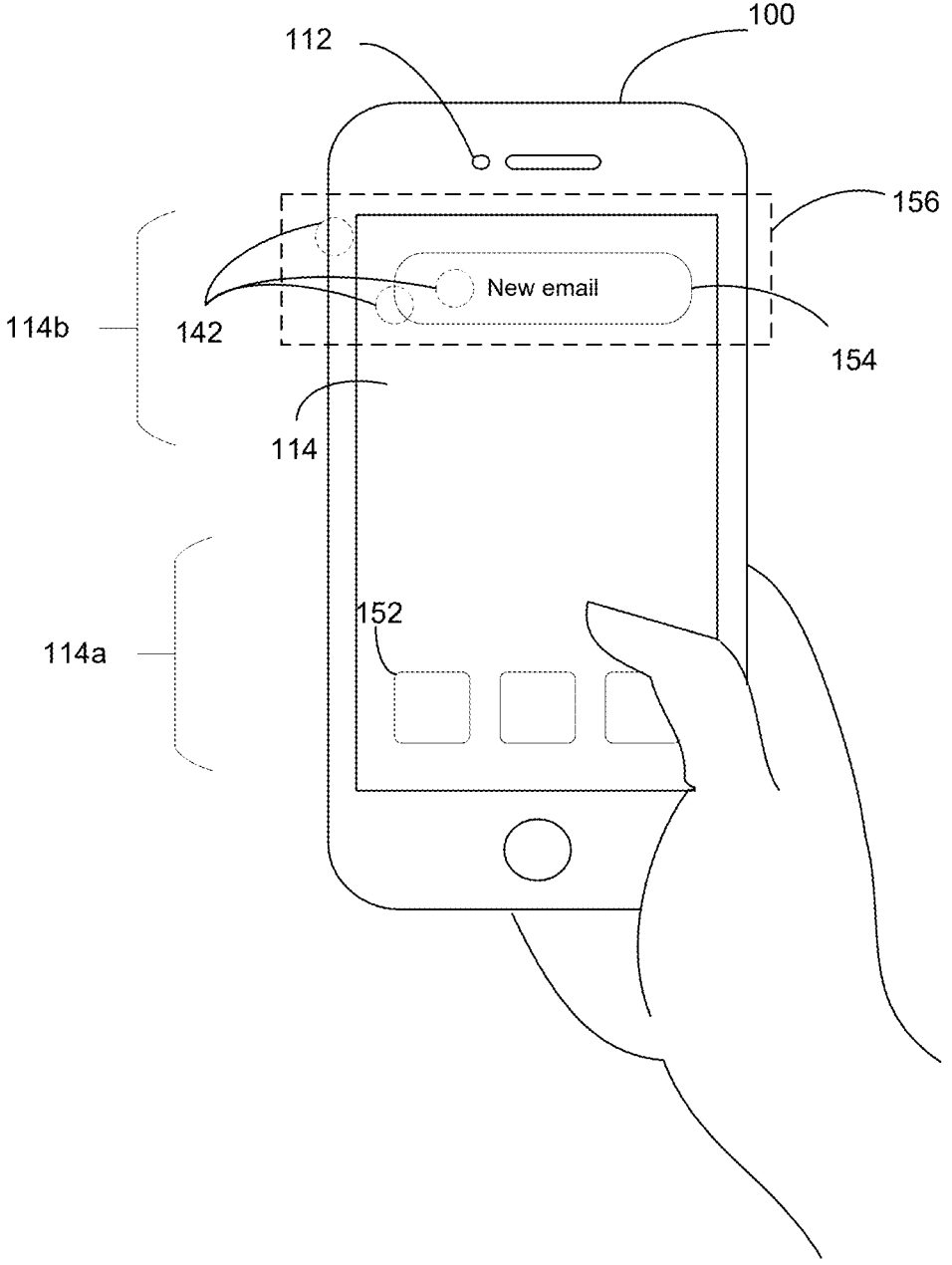
FIGS. 2A-2C illustrate an example of gaze-based device interaction for interacting with a displayed notification, in accordance with examples of the present disclosure.
Figure 2B:
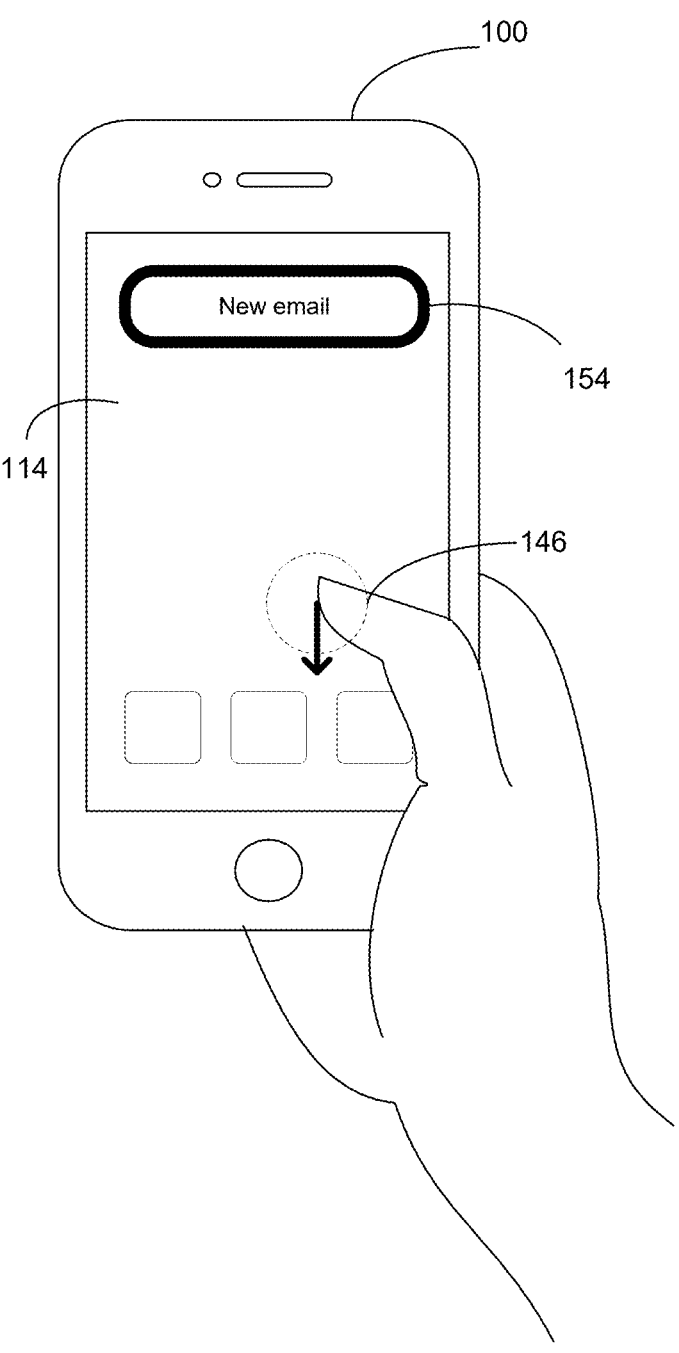
Figure 2C:
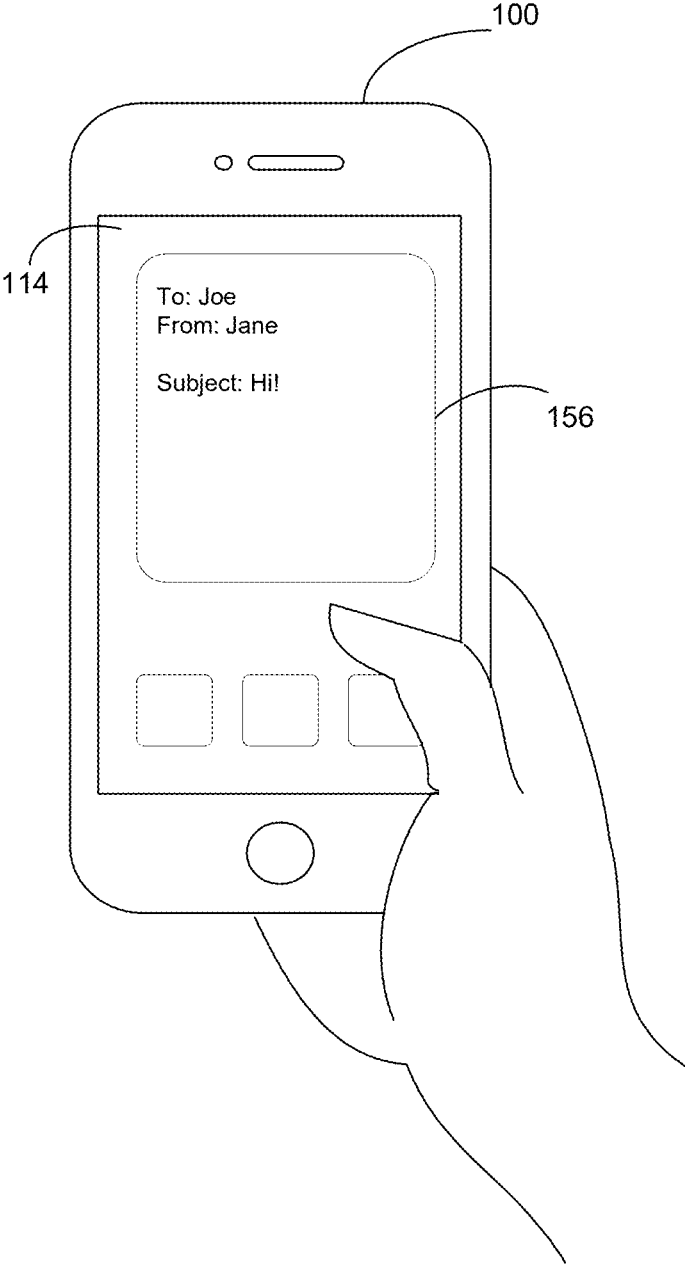

FIGS. 2A-2C illustrate an example embodiment for gaze-based device interaction, in accordance with examples of the present disclosure. Although FIGS. 2A-2C are illustrated in the context of a smartphone as the electronic device 100, this is not intended to be limiting.

In FIG. 2A, a plurality of interactive elements 152 (e.g., selectable icons) are shown on the touch-sensitive display 114, for example while a home screen or application selection page is displayed. In particular, the interactive elements 152 may be displayed in a first region 114*a* of the touch-sensitive display 114 (which may be a lower region of the display 114) that can be readily accessible by a user's touch (e.g., using the thumb) when the user is holding and interacting with the electronic device 100 using the same hand (e.g., in the one-handed pose). The electronic device 100 is initially in a default mode where the user may interact with the interactive elements 152 using conventional touch inputs.

As shown in FIG. 2A, a notification 154 (e.g., a notification related to an incoming message, such as a new email) may be displayed in a second region 114*b* of the display 114 (which may be an upper region of the display 114) that is not readily accessible by the user's touch (e.g., using the thumb) when the user is holding and interacting with the electronic device 100 using the same hand (e.g., in the one-handed pose).

In examples of the present disclosure, display of the notification 154 may cause the user's gaze to be detected and tracked (e.g., using the camera 112 to capture images of the user's eyes and using the gaze tracker 132 to track the gaze from the captured images) over a defined time period (e.g., 1-2 seconds from the time the notification 154 is displayed). During the defined time period, the gaze tracker 132 may detect the locations of the points of gaze 142 at different timesteps (e.g., one point of gaze 142 may be detected per frame captured by the camera 112). The locations (e.g., x, y-coordinates based on the frame of reference of the display 114) of the points of gaze 142 may be stored in the buffer 138. The buffer 138 may be a first-in first-out (FIFO) buffer that stores the location data of the most recent points of gaze 142. The buffer 138 may be used to implement a sliding window that corresponds to a time (e.g., most recent 0.5 seconds) shorter than the defined time period. For example, if the gaze tracker 132 processes frames at 20 fps, then the buffer 138 may be sized to store the last ten points of gaze 142 (which corresponds to a sliding window of the last 0.5 seconds). It should be noted that the size of the buffer 138, size of the sliding window and length of the defined time period may all be selectable parameters (e.g., depending on the frame rate of the camera 112 and/or speed of the gaze tracker 132). As well, other techniques may be used to implement the sliding window.

The UI controller 134 (or other system-level controller) may check if the locations of the most recent points of gaze 142 in the sliding window fall within a proxy region 156 that is defined to encompass at least the display area of the notification 154. In particular, the proxy region 156 may extend to cover an area larger than the displayed notification 154. For example, the proxy region 156 may extend 1 cm outside of the left, right, top and bottom borders of the displayed notification 154. It should be noted that the proxy region 156 may extend different amounts in different directions and the proxy region 156 may be any shape or size. As illustrated in FIG. 2A, the proxy region 156 may in some examples extend outside of the display 114 and/or outside of the device 100. The proxy region 156 may be defined to be larger than the display area of the notification 154 to allow for possible inaccuracies and/or imprecision in the determined location of the points of gaze 142. This allows for the use of a gaze tracker 132 that requires less calibration or no calibration, requires less processing power to execute and/or requiring less costly hardware. Further, using the proxy region 156 may allow for the notification 154 to be determined to be the focus of the user's gaze without requiring a fixated gaze (e.g., allowing the user's gaze to saccade over the proxy region 156), which may be more natural for the user.

If, by the expiry of the defined time period, the UI controller 134 (or other system-level controller) determines that there is no sliding window where the locations of the most recent points of gaze 142 all fall within the proxy region 156 (or fail to meet a threshold percentage of the most recent points of gaze 142 falling within the proxy region 156), then the gaze tracking may automatically stop and the electronic device 100 may stay in the default mode. Conventional touch interactions continue to be supported and the notification 154 may or may not continue to be displayed.

Optionally, during the defined time period, a visual modification of the notification 154 may be provided to indicate to the user whenever the point of gaze 142 is determined to fall within the proxy region 156. For example, the notification 154 may be highlighted or bordered in a yellow color whenever the point of gaze 142 is determined to fall within the proxy region 156. This may enable the user to alter their gaze away from the proxy region 156 if the user is not interested in interacting with the notification 154, for example.

If, before expiry of the defined time period, the UI controller 134 (or other system-level controller) determines that the locations of the most recent points of gaze 142 in at least one sliding window all fall within the proxy region 156

(or a threshold percentage of the most recent points of gaze 142 in the sliding window fall within the proxy region 156), then the electronic device 100 is switched to one-handed mode and the notification 154 is determined to be the target of touch interactions, as illustrated in FIG. 2B. Thus, the detection of the points of gaze 142 within the proxy region 156 may be interpreted to mean that the user wishes to interact with the notification 154. In the one-handed mode, the notification 154 may be displayed with a visual modification (e.g., highlighted or green colored border, as illustrated in FIG. 2B) to indicate that the notification 154 is determined to be the target of touch interactions. The user may then interact with the notification 154 using one-handed gestures anywhere on the display 114, including regions of the display 114 outside of the area of the displayed notification 154. In particular, as shown in FIG. 2B, a touch gesture such as a swipe down gesture 146 may be performed in a region accessible by the user's thumb, outside of the area of the displayed notification 154.

While the electronic device 100 is in the one-handed mode (also referred to as active mode) and the notification 154 is determined to be the target of touch interactions, the swipe down gesture 146 is processed as an interaction with the notification 154. For example, as shown in FIG. 2C, the swipe down gesture 146 may be processed as an interaction to open the message 156 related to the notification 154. Other types of touch input and interaction may be possible, depending on implementation. In some examples, the one-handed mode may enable any touch interaction (e.g., swipe down to open, swipe up to dismiss, swipe left/right to view next, etc.) that would conventionally need to be performed in the area of the notification 154 to instead be performed outside of the area of the notification 154. The electronic device 100 may automatically switch back to the default mode (or inactive mode) after the user has interacted with the notification 154, to enable the user to continue interacting with the electronic device 100 in the conventional manner.

In some examples, after the electronic device 100 has switched to the one-handed mode and the notification 154 has been determined to be the target of touch interactions (e.g., as illustrated in FIG. 2B), gaze tracking may be stopped. This may reduce the consumption of computing resources, because gaze tracking may no longer be necessary.

In some examples, after the electronic device 100 has switched to the one-handed mode and the notification 154 has been determined to be the target of touch interactions (e.g., as illustrated in FIG. 2B), conventional touch interactions (e.g., touch input in the area of the notification 154) may continue to be supported. In some examples, if the user interacts with the notification 154 in the conventional manner (e.g., provide touch input in the area of the displayed notification 154) at any time while the notification 154 is displayed, the electronic device 100 may automatically stop gaze tracking and switch to (or remain in) the default mode. This may enable a user to continue to interact with the electronic device 100 in a conventional manner, thus avoiding user frustration when the user has not learned how to interact with the electronic device 100 in the one-handed mode.

FIG. 3 is a flowchart illustrating an example method 300 for gaze-based device interaction, in accordance with examples of the present disclosure. The method 700 may be implemented by an electronic device (e.g., the electronic device 100 of FIG. 1A). For example, the processing unit 102 may execute instructions in the memory 108 (e.g., instructions for the gaze tracker 132 and/or UI controller 134) to cause the electronic device 100 to carry out the example method 300.

At the start of the method 300, the device may operate in a default mode. In the default mode, conventional device interactions are supported. For example, in the default mode, touch input in the display area of a UI element (e.g., icon) may be used to interact with that UI element.

At 302, a notification is displayed on the touch-sensitive display of the device. For example, an application (e.g., messaging application) executing on the device may generate a notification related to an incoming message and the notification is displayed. The notification may be displayed in a region of the display that is not readily accessible by touch input, such as being out of reach of a user's thumb when the user is holding and interacting with a handheld device using the same hand (e.g., using a one-handed pose).

At 304, gaze tracking is performed (e.g., using the gaze tracker 132). The gaze tracking may be performed using frames captured by a front-facing camera (e.g., the camera 112) of the device. In some examples, gaze tracking may be activated in response to display of the notification. In other examples, gaze tracking may be already activated prior to display of the notification (e.g., gaze tracking may always be active on the device). Gaze tracking is used to determine the location (e.g., represented using x,y-coordinates in a frame of reference of the display) of a point of gaze at each time step (where each time step may corresponding to a frame captured in real-time by a front-facing camera of the device). Various gaze tracking techniques may be used. For instance, some example suitable gaze tracking techniques are described in U.S. Pat. No. 11,630,510, entitled "System, method and storage medium for 2D on-screen user gaze estimation", the entirety of which is hereby incorporated by reference.

At 306, the device determines, within a defined time period (which may be defined starting from the time the notification is displayed), whether recent point of gaze locations fall within a proxy region of the notification (where the proxy region is defined as a region encompassing the display area of the notification and possibly extending beyond the display area of the notification). For example, a sliding window may be used to define a set of point of gaze locations as the recent point of gaze locations. It may be determined whether a threshold amount of the point of gaze locations in the sliding window fall within the proxy region of the notification. The size and shape of the proxy region may be defined based on the accuracy and/or precision of the point of gaze locations determined by gaze tracking. For example, if the gaze tracker 132 is known to have an error of +/−0.5 cm in all directions, then the proxy region may be defined to extend 0.5 cm beyond the borders of the display area of the notification. The defined time period may be defined empirically, for example based on typical user behavior (e.g., the defined time period may be 2 seconds based on empirical findings that a user would be most likely to interact with a displayed notification within the first 2 seconds of the notification being displayed). The proxy region may be defined using x,y-coordinates in the frame of reference of the display (e.g., if the proxy region is a rectangular region, the proxy region may be defined using the x,y-coordinates of each corner), same as the frame of reference of the point of gaze locations. The sliding window captures a defined number of the most recent point of gaze locations. Various techniques may be used to implement the sliding window. For example, optional steps 308-310 may be performed, in which a buffer is used to implement the sliding window.

At 308, a buffer (e.g., the buffer 138) is used to store the most recent point of gaze location. The buffer may be a FIFO buffer that stores the N most recent point of gaze locations (e.g., corresponding to point of gaze locations determined from the N most recently captured frames). The value of N may be selected to correspond to a desired length of time (e.g., 0.5 seconds) for the sliding window, and may depend on the inference speed of gaze tracking (e.g., dependent on the frame rate of the camera and/or the speed of the gaze tracker). For example, if the sliding window is desired to correspond to 0.5 seconds and the frame rate of the camera is 20 fps, then N may be selected to be 10. In some examples, the point of gaze location stored in the buffer may be temporally smoothed. Various techniques may be used to perform this temporal smoothing including, without limitation, techniques using simple linear filters, Kalm filters, 1-Euro filters, or other suitable temporal filtering methods.

At 310, while the defined time period has not yet expired, it is determined whether a threshold amount (which may be represented as a threshold number or a threshold percentage) of the point of gaze locations in the buffer fall within the proxy region of the notification. For example, if there are at least N point of gaze locations stored in the buffer, the device may determine if at least ceil(pN) out of the N stored locations fall within the defined proxy region, where p represents a threshold percentage (p being a value larger than zero and equal to or less than 1) and ceil( ) is the ceiling operation that rounds up to the smallest integer equal to or greater than pN. The threshold percentage may, for example, be 100% (i.e., p=1.0) or 80% (i.e., p=0.8), among other possibilities, and may be set empirically.

The method 300 may remain at step 306 until the defined time period has expired or there is at least one sliding window where a threshold amount of point of gaze locations fall within the proxy region, whichever occurs first. If, within the defined time period, there is at least one sliding window where the threshold amount of point of gaze locations fall within the proxy region, then the method 300 proceeds to 312.

At 312, the device operates in one-handed mode where the notification is determined to be the interaction target. In the one-handed mode, touch input outside the display area of the interaction target (e.g., outside the display area of the notification) may be used to interact with the interaction target. Step 312 may include optional step 314, optional step 316, optional step 318, step 320 and step 322.

At 314, optionally, gaze tracking may be terminated (e.g., stop capturing images using the front-facing camera 112 and stop executing the gaze tracker 132). This may be done to reduce consumption of computing resources (e.g., battery power, processing power, memory, etc.).

At 316, optionally, notification may be indicated as the determined interaction target. For example, the UI controller 134 may cause the notification to be displayed with a visual highlight or border to indicate the notification is the interaction target.

At 318, optionally, a one-handed UI may be displayed. The one-handed UI may provide visual indicators to inform the user how they may use touch input to interact with the notification and/or may provide UI elements in a thumb-accessible region of the display for interacting with the notification. Examples of a one-handed UI are described further below.

At 320, touch input is detected on the touch sensitive display, outside of the display area of the notification. For example, a touch input (e.g., swipe gesture) may be detected in a thumb-accessible region of the display (e.g., lower portion of the display) while the notification is displayed in a thumb-inaccessible region of the display (e.g., upper portion of the display).

At 322, the touch input is processed (e.g., by the UI controller 134 or other system-level controller) as an interaction with the notification. For example, the types of touch input that may be processed as an interaction with the notification may be the same as conventional touch input (e.g., conventional swipe up, swipe down, swipe left/right gestures) a user would use to interact with the notification, except that the touch input no longer needs to be performed in the display area of the notification.

After an interaction with the notification has been processed, the method 300 may proceed to step 322 where the device returns to operation in the default mode. In some examples, the method 300 may proceed to step 322 if touch input has been detected in the display area of the notification (e.g., the user has interacted with the notification in a conventional manner). In some examples, the method 300 may automatically proceed to step 322 if, after the device has operated in the one-handed mode for a defined period of time (e.g., 5 seconds), there has not been any interaction with the notification.

Returning to step 306, if, after the defined time period has expired, there has not been any sliding window in which at least a threshold amount of point of gaze locations fall within the proxy region of the notification, the method 300 may proceed to step 322 where the device continues to operate in the default mode. In some examples, if the user interacts with the displayed notification using conventional touch input (e.g., touch input is detected in the display area of the notification) during the defined time period, the method 300 may automatically proceed from step 306 to step 322 without waiting for expiry of the defined time period.

At step 322, the device operates in the default mode where conventional device interactions are supported. Gaze tracking may be terminated (e.g., stop capturing images using the front-facing camera 112 and stop executing the gaze tracker 132). This may be done to reduce consumption of computing resources (e.g., battery power, processing power, memory, etc.). Optionally, if there has not been any interaction with the notification (whether conventional interaction or interaction in the one-handed mode), the notification may be automatically dismissed.

During the method 300, conventional device interactions (e.g., touch interactions in the display area of the notification) may continue to be supported and detection of conventional interactions with the notification may override interactions in the one-handed mode. For example, if touch input is detected in the display area of the notification at any time during the method 300, the method 300 may automatically proceed to step 322 to operate the device in the default mode.

Figure 4:
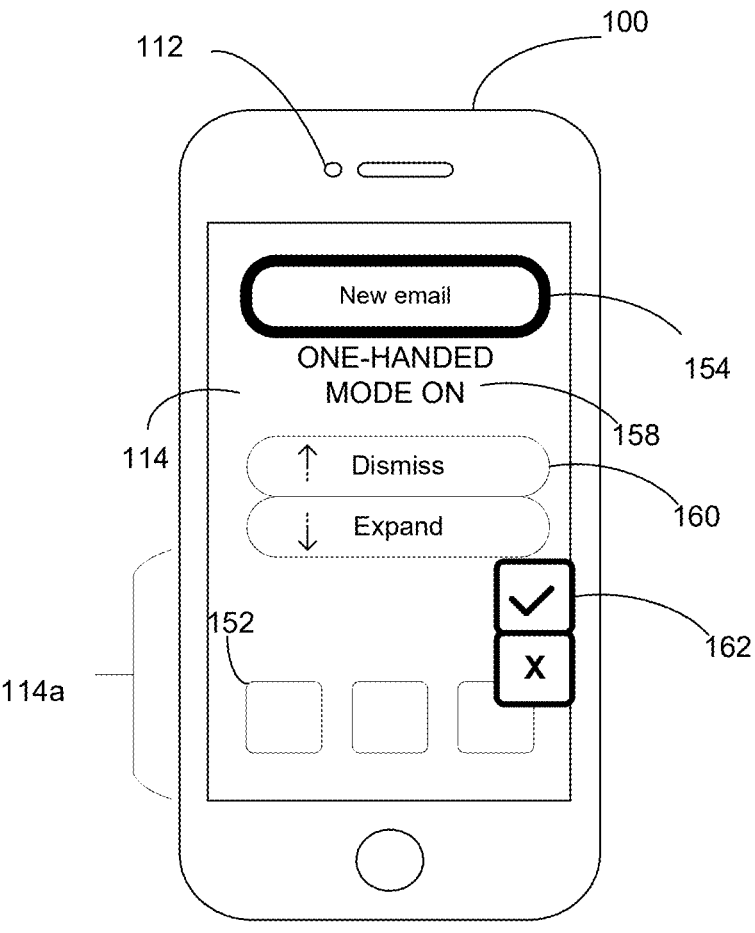
FIG. 4 illustrates an example of a one-handed user interface, in accordance with examples of the present disclosure.

Reference is now made to FIG. 4, which illustrates an example one-handed UI that may be displayed (e.g., at optional step 318) when the electronic device 100 is operating in one-handed mode.

As illustrated in FIG. 4, when the electronic device 100 is in one-handed mode and the notification 154 has been determined to be the interaction target, the notification 154 may be displayed with a visual modification (e.g., highlighting, different colored border, etc.) to indicate the notification

154 is the interaction target. Optionally, a visual element, such as a message 158 or icon, may be displayed to indicate that the device 100 is operating in one-handed mode.

Optionally, one or more visual indicators 160 may be provided to indicator to the user the types of touch inputs they may use to interact with the notification 154 (e.g., swipe up to dismiss, swipe down to expand). Optionally, one or more UI elements 162 may be displayed in the first region 114_a_ of the touch-sensitive display 114 (which may be a lower region of the display 114) that can be readily accessible by a user's touch (e.g., using the thumb), which may be selected by touch input in order to interact with the notification 154. In FIG. 4, the UI elements 162 include a "check" element that may be selected (via touch input at the element) to open the message related to the notification 154 and a "x" element that may be selected (via touch input at the element) to dismiss the notification 154. Other UI elements 162 may be displayed for other types of interactions, such as replying to the message sending, viewing a verification code related to the notification 154, etc.

It should be understood that although FIG. 4 displays multiple aspects of the one-handed UI, the one-handed UI may or may not include any combination of one or more of the visual modification of the notification 154, message 158, visual indicator 160 and/or UI element 162 described above. In general, the one-handed UI may only use a subset of the aspects described above, so as to avoid visual clutter. In some examples, the one-handed UI may be customizable by the user. For example, the location of the UI elements 162 may be selected by the user to suit the placement of the user's thumb.

In some examples, while one or more UI elements 162 are displayed in the one-handed UI, touch input outside of the UI elements 162 (e.g., in the display area of the notification 154, on any of the icons 154 or elsewhere on the display 114) may cause the one-handed UI to be automatically dismissed and the device 100 may automatically return to operation in the default mode.

In some examples, the user may select between displaying the one-handed UI when the device 100 is in the one-handed mode, or not displaying the one-handed UI when the device 100 is in the one-handed mode.

In various examples, the present disclosure describes methods and devices that provides a gaze-based HMI mechanism, which may enable a user to perform touch interactions with a notification (or other UI element) that is displayed outside of a region easily accessible by a user's touch. Examples of the present disclosure may be useful for enabling touch interactions by a user's thumb when the user is interaction with and holding a handheld device in the same hand, for example. In various examples, a gaze-based mechanism is disclosed that enables device operation to change to a one-handed mode, in which touch input outside of the display area of a UI element that is an interaction target (e.g., a displayed notification) may be used to interact with the interaction target.

Examples of the present disclosure provides a mechanism (e.g., using proxy region and sliding window) to detect the intended interaction target, based on the user's gaze, without requiring high accuracy or high precision in gaze tracking. This may provide a technical advantage in that the need for calibrating a gaze tracking system may be avoided and the use of computing resources may be reduced.

Examples of the present disclosure may provide a more intuitive and/or convenient mechanism for a user to interact with a displayed notification using their thumb, while holding a handheld device in a one-handed pose. In some examples, a one-handed UI may be provided to help guide the user's interactions.

Although the present disclosure has described example implementation using various modules and systems, it should be understood that examples of the present disclosure may be implemented in various ways, such as implementation as part of an operating system, as an internal function of a device, as an application programming interface (API) function in a software development kit (SDK) that enables a software developer to develop a HMI mechanism, etc.

Examples of the present disclosure may be applicable to any electronic device that is capable of receiving touch inputs (e.g., has touch-sensitive display or other sensors capable of detecting touch) and/or is in communication with a touch-sensitive input device. The electronic device may also be capable of gaze tracking and/or is in communication with a gaze tracking system. The electronic device may include smartphones, touch-enabled monitors, touch-based kiosk devices, laptop devices, desktop devices (which may be coupled to a touch-sensitive input device), tablet devices, e-reader or e-ink display devices, smart watches, and gaming devices, among others.

It should be understood that examples of the present disclosure may be embodied as a method, an apparatus, a non-transitory computer readable medium, a processing module, a chipset, a system chip or a computer program, among others. An apparatus may include a transmitting module configured to carry out transmitting steps described above and a receiving module configured to carry out receiving steps described above. An apparatus may include a processing module, processor or processing unit configured to control or cause the apparatus to carry out examples disclosed herein.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method at an electronic device, the method comprising:

causing gaze tracking to be performed in response to display of a notification on a touch-sensitive display of the electronic device while the electronic device is operating in a default mode, wherein, in the default mode, an interaction with the notification is enabled by detecting a touch input on the touch sensitive display within the notification;

determining, within a defined time period starting from the display of the notification, that recent point of gaze locations determined by the gaze tracking fall within a proxy region of the notification, the proxy region being defined to encompass a display area of the notification and extended to cover an area larger than the display area of the notification; and switching operation of the electronic device to a one-handed mode in response to determining that recent point of gaze locations fall within the proxy region of the notification within the defined time period starting from the display of the notification, wherein, in the one-handed mode, the notification is determined to be an interaction target of the touch input detected anywhere on the touch-sensitive display including outside the notification, and the interaction with the notification is enabled by detecting the touch input anywhere on the touch-sensitive display.

2. The method of claim 1, wherein determining that recent point of gaze locations fall within the proxy region of the notification comprises:

using a sliding window, corresponding to a time window shorter than the defined time period, to define the recent point of gaze locations; and determining that a threshold amount of point of gaze locations in the sliding window fall within the proxy region of the notification.

3. The method of claim 2, wherein determining that recent point of gaze locations fall within the proxy region of the notification comprises:

storing the determined point of gaze location at each timestep in a first-in first-out buffer, the buffer being sized to correspond to the time window of the sliding window; and determining that a threshold number of point of gaze locations stored in the buffer fall within the proxy region of the notification.

4. The method of claim 1, further comprising, during operation of the electronic device in the one-handed mode:

detecting the touch input on the touch-sensitive display outside a display area of the notification; and processing the touch input as the interaction with the notification.

5. The method of claim 1, further comprising, during operation of the electronic device in the one-handed mode:

detecting another touch input on the touch-sensitive display in a display area of the notification; and switching operation of the electronic device back to the default mode and processing the other touch input as the interaction with the notification.

6. The method of claim 1, further comprising, during operation of the electronic device in the one-handed mode:

displaying a one-handed user interface (UI) including at least one of:

a visual indicator indicating a type of touch input for interacting with the notification;

a UI element displayed in a thumb-accessible region of the touch-sensitive display for interacting with the notification;

a visual element indicating operation in the one-handed mode; or a visual modification of the notification.

7. The method of claim 1, wherein the notification is displayed in a thumb-inaccessible region of the touch-sensitive display.

8. The method of claim 1, further comprising:

in response to switching operation of the electronic device to the one-handed mode, terminating gaze tracking.

9. An electronic device comprising:

a processing unit configured to execute instructions to cause the electronic device to:

cause gaze tracking to be performed in response to display of a notification on a touch-sensitive display of the electronic device while the electronic device is operating in a default mode, wherein, in the default mode, an interaction with the notification is enabled by detecting a touch input on the touch sensitive display within the notification;

determine, within a defined time period starting from the display of the notification, that recent point of gaze locations determined by the gaze tracking fall within a proxy region of the notification, the proxy region being defined to encompass a display area of the notification and extended to cover an area larger than the display area of the notification; and switching operation of the electronic device to a one-handed mode in response to determining that recent point of gaze locations fall within the proxy region of the notification within the defined time period starting from the display of the notification, wherein, in the one-handed mode, the notification is determined to be an interaction target of the touch input detected anywhere on the touch-sensitive display including outside the notification, and the interaction with the notification is enabled by detecting the touch input anywhere on the touch-sensitive display.

10. The electronic device of claim 9, wherein the processing unit is configured to execute the instructions to cause the electronic device to determine that recent point of gaze locations fall within the proxy region of the notification by:

using a sliding window, corresponding to a time window shorter than the defined time period, to define the recent point of gaze locations; and determining that a threshold amount of point of gaze locations in the sliding window fall within the proxy region of the notification.

11. The electronic device of claim 10, wherein the processing unit is configured to execute the instructions to cause the electronic device to determine that recent point of gaze locations fall within the proxy region of the notification by:

storing the determined point of gaze location at each timestep in a first-in first-out buffer, the buffer being sized to correspond to the time window of the sliding window; and determining that a threshold number of point of gaze locations stored in the buffer fall within the proxy region of the notification.

12. The electronic device of claim 9, wherein the processing unit is configured to execute the instructions to cause the electronic device to, during operation of the electronic device in the one-handed mode:

detect the touch input on the touch-sensitive display outside a display area of the notification; and process the touch input as the interaction with the notification.

13. The electronic device of claim 9, wherein the processing unit is configured to execute the instructions to cause the electronic device to, during operation of the electronic device in the one-handed mode:

detect another touch input on the touch-sensitive display in a display area of the notification; and switch operation of the electronic device back to the default mode and processing the other touch input as the interaction with the notification.

14. The electronic device of claim 9, wherein the processing unit is configured to execute the instructions to cause the electronic device to, during operation of the electronic device in the one-handed mode:

display a one-handed user interface (UI) including at least one of:

a visual indicator indicating a type of touch input for interacting with the notification;

a UI element displayed in a thumb-accessible region of the touch-sensitive display for interacting with the notification;

a visual element indicating operation in the one-handed mode; or a visual modification of the notification.

15. The electronic device of claim 9, wherein the notification is displayed in a thumb-inaccessible region of the touch-sensitive display.

16. The electronic device of claim 9, wherein the processing unit is configured to execute the instructions to cause the electronic device to:

in response to switching operation of the electronic device to the one-handed mode, terminate gaze tracking.

17. A non-transitory computer readable medium having instructions stored thereon, wherein the instructions are executable by a processing unit of an electronic device to cause the electronic device to:

cause gaze tracking to be performed in response to display of a notification on a touch-sensitive display of the electronic device while the electronic device is operating in a default mode, wherein, in the default mode, an interaction with the notification is enabled by detecting a touch input on the touch sensitive display within the notification;

determine, within a defined time period starting from the display of the notification, that recent point of gaze locations determined by the gaze tracking fall within a proxy region of the notification, the proxy region being defined to encompass a display area of the notification and extended to cover an area larger than the display area of the notification; and switching operation of the electronic device to a one-handed mode in response to determining that recent point of gaze locations fall within the proxy region of the notification within the defined time period starting from the display of the notification, wherein, in the one-handed mode, the notification is determined to be an interaction target of the touch input detected anywhere on the touch-sensitive display including outside the notification, and the interaction with the notification is enabled by detecting the touch input anywhere on the touch-sensitive display.

18. The non-transitory computer readable medium of claim 17, wherein determining that recent point of gaze locations fall within the proxy region of the notification comprises:

using a sliding window, corresponding to a time window shorter than the defined time period, to define the recent point of gaze locations; and determining that a threshold amount of point of gaze locations in the sliding window fall within the proxy region of the notification.

19. The non-transitory computer readable medium of claim 18, wherein determining that recent point of gaze locations fall within the proxy region of the notification comprises:

storing the determined point of gaze location at each timestep in a first-in first-out buffer, the buffer being sized to correspond to the time window of the sliding window; and determining that a threshold number of point of gaze locations stored in the buffer fall within the proxy region of the notification.

20. The method of claim 1, further comprising:

returning operation of the electronic device to the default mode;

displaying a second notification on the touch-sensitive display of the electronic device while the electronic device is operating in the default mode;

causing gaze tracking to be performed in response to the display of the second notification;

determining, within a second defined time period starting from the display of the second notification, that point of gaze locations determined by the gaze tracking fall outside of the second proxy region of the second notification; and ending the gaze tracking after expiry of the second defined time period and maintaining operation of the electronic device in the default mode.

* * * * *